United States Patent [19]
Cuomo

[11] Patent Number: 4,599,711
[45] Date of Patent: Jul. 8, 1986

[54] MULTI-LEVER MINIATURE FIBER OPTIC TRANSDUCER

[75] Inventor: Frank W. Cuomo, East Providence, R.I.

[73] Assignee: The United States of America as represented by the Secretary of the Navy, Washington, D.C.

[21] Appl. No.: 665,464

[22] Filed: Oct. 29, 1984

[51] Int. Cl.[4] ........................ H04R 23/00; G01L 7/08

[52] U.S. Cl. .................................... 367/141; 367/149; 73/655; 250/227

[58] Field of Search ........................ 367/141, 169, 149; 73/655, 705; 332/7.51; 350/96.15, 96.29, 96.18; 250/227

[56] References Cited

U.S. PATENT DOCUMENTS

| | | | |
|---|---|---|---|
| 3,580,082 | 5/1971 | Strack | 73/655 X |
| 3,831,137 | 8/1974 | Cuomo | 367/141 |
| 3,940,608 | 2/1976 | Kissinger et al. | 250/227 |
| 4,210,029 | 7/1980 | Porter | 73/705 |
| 4,310,905 | 1/1982 | Palmer | 367/149 X |
| 4,329,017 | 5/1982 | Kapany et al. | 350/96.18 X |
| 4,446,543 | 5/1984 | McLandrich et al. | 367/141 X |
| 4,550,975 | 11/1985 | Levinson et al. | 350/96.18 |

*Primary Examiner*—Charles T. Jordan
*Assistant Examiner*—John W. Eldred
*Attorney, Agent, or Firm*—Robert F. Beers; Arthur A. McGill; Michael J. McGowan

[57] ABSTRACT

An improved bifurcated multi-lever fiber optic transducer comprising one light transmitting fiber and two receive fibers having different core diameters separated at one end and combined at the common distal end in the vicinity of a reflective surface parallel to the fiber end plane which is sensitive to axial motion caused by minute pressure changes, either in air or water, such that any displacement of the reflector from equilibrium will increase or decrease the illuminated areas of the two receive fibers which can be used to generate a processed output signal proportional to this motion. The resulting probe is of minimal diameter, has significantly improved sensitivity and produces an output independent of power variations at the input.

5 Claims, 11 Drawing Figures

MULTI-LEVER MINIATURE FIBER OPTIC TRANSDUCER

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1) Field of the Invention

The present invention relates to a fiber optic transducer and more particularly to a small diameter bifurcated multi-lever miniature, fiber optic lever hydrophone having high sensitivity.

(2) Description of the Prior Art

The utilization of a bifurcated fiber optic bundle for the detection of minute mechanical displacements has been previously described in several U.S. patents. Kissinger, in U.S. Pat. Nos. 3,327,584 and 3,940,608 proposed the use of two optical fiber bundles joined randomly at one end to construct a fiber optic proximity probe while Frank, in U.S. Pat. No. 3,273,447 introduced a similar method for the detection of temperature, pressure and other quantities. This concept has also been applied to the measurement of pressures as described by Strack, in U.S. Pat. No. 3,580,082 and Porter in U.S. Pat. Nos. 3,789,667 and 4,210,029. Moreover, the concept has been extended to the monitoring of acoustic pressures and pressure gradients by Palmer in U.S. Pat. No. 4,310,905 and in my U.S. Pat. No. 3,831,137, respectively. With the exception of Palmer, the key element of the above fiber optic lever patents is a flexible bifurcated bundle of optical fibers whose common end is placed in the vicinity of a reflective surface such that any motion of the reflector modulates the light intensity of the reflected light beam entering the receive fibers thus generating an electrical signal proportional to the light variations. It is noted the the sensitivity of such a device is proportional to some light transfer coefficient, which can be expressed as the ratio of the optical power intercepted by a receiving fiber at the distal end upon reflection to the total light power emitted by a transmitting fiber at the same end. In addition, the sensitivity is proportional to the total number of adjacent transmit/receive fiber pairs used in the bundle. Thus, for good sensitivity the transmit/receive fiber distribution at the distal end must be maximized while the total number of fibers must be large thereby restricting the minimum possible size of a detecting probe. In some applications, such as in the implementation of the fiber optic lever towed array described in my co-pending U.S. patent application, Ser. No. 547,273, small probe dimensions are important. In addition, when the concept of the above application is extended to the log periodic array approach described in my U.S. Pat. No. 4,363,115 the upper frequency limit of operation is dependent upon the closest element spacing realizable with the smallest possible element design. What is required is a small diameter fiber optic lever probe with high sensitivity.

SUMMARY OF THE INVENTION

Accordingly, it is a general purpose and object of the present invention to provide a miniature fiber optic hydrophone based on the principles of the fiber optic lever. It is a further object that such fiber optic hydrophone sensors be passive in the sense that no power is required when used at the wet end of a small diameter, towed acoustic line array. Another object is that the fiber arrangement at the sensor produce a relatively high sensitivity using a small number of transmit and receive fibers.

These objects are accomplished with the present invention by providing an improved bifurcated fiber optic transducer comprising one transmit fiber and at least one pair of receive fibers, each receive fiber pair having different core diameter fibers. The transmit and receive fibers are separated at one end and combined at the distal end in the vicinity of a miniature reflective surface sensitive to axial motion caused by minute pressure changes, either in air or water, such that any displacement of the reflector from equilibrium will increase or decrease different illuminated areas of the receive fibers which can be used to generate a processed output signal proportional to this motion thus providing a sensitivity and an output independent of variations at the input.

A more complete understanding of the invention and many of the attendant advantages thereto will be readily appreciated as the same becomes better understood by reference to the following detailed description when considered in conjunction with the accompanying drawings wherein:

DESCRIPTION OF THE PREFERRED EMBODIMENT

Figure 1:
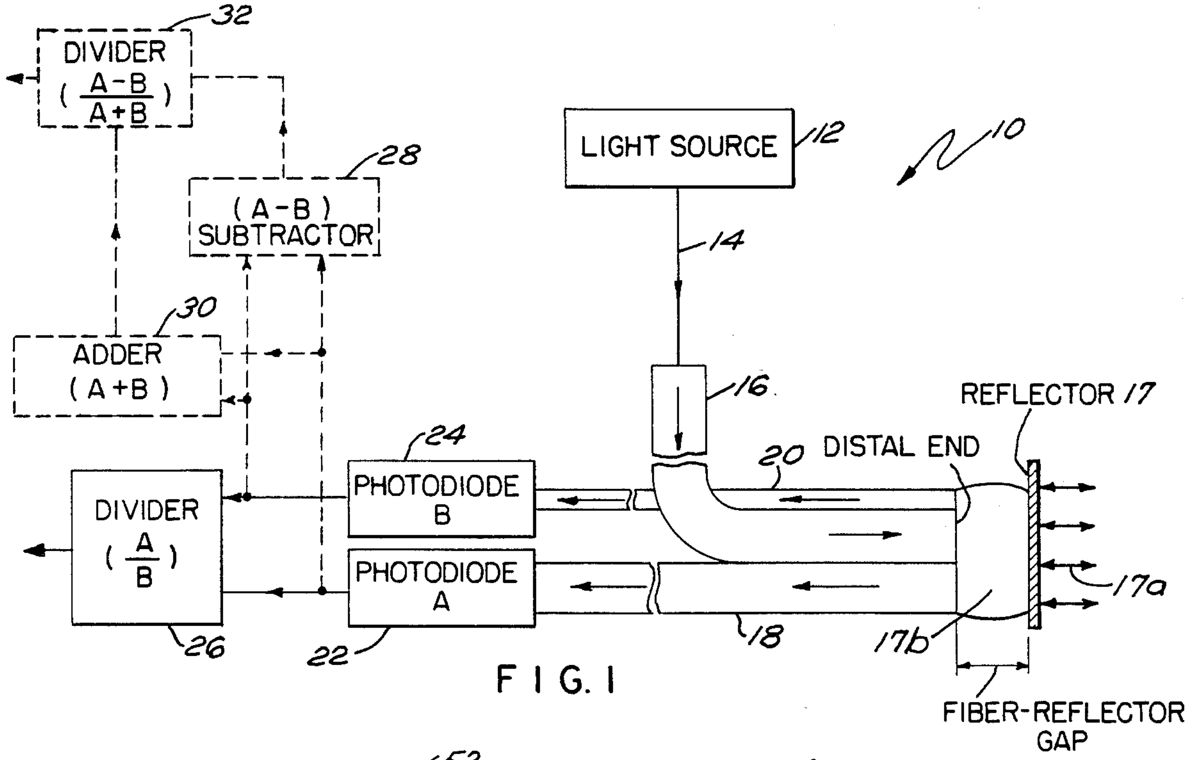
FIG. 1 shows a block diagram of a fiber optic lever system according to the teachings of the present invention.

Referring now to FIG. 1 there is shown an improved fiber optic lever system 10 comprising a coherent or incoherent light source 12 which emits a beam 14 of visible or infrared light. Beam 14 is directed through at least one transmitting fiber 16. At the distal end of fiber 16 at least one pair of receiving fibers 18 and 20 are placed adjacent to and aligned with transmitting fiber 16, the transmit and receive fibers being positioned at the same distance (fiber-reflector gap) from a common reflector 17. Reflector 17 is positioned essentially parallel to the common end plane of the distal ends of fibers 16, 18 and 20 and is moveably mounted to the fibers in such a way as to respond to minute pressure variations 17*a*. One such moveable mounting means is a bead of optically clear potting compound 17*b*, such as G.E. #655 clear silicone rubber, which bonds reflector 17 to the distal ends of fibers 16, 18 and 20. The modulated return beams transmitted by receive fibers 18 and 20 are coupled to photodiodes 22 and 24, labeled A and B, respectively where the modulated light signals are converted to proportional electrical signals. The A and B electrical output signals from photodiodes 22 and 24 may then be processed in either of two ways, each of which greatly improve the sensitivity of the transducer and remove the effects of the input power variations on the system 10 output while keeping the number of optical fibers at the distal end to a minimum. The first approach transmits outputs A and B to divider 26 where the ratio A/B is obtained. Alternately, the second aproach transmits outputs A and B to subtractor 28 and adder 30 which produce A−B and A+B outputs respectively. These outputs from blocks 28 and 30 are then combined in divider 32 to obtain the ratio A−B-/A+B.

Figure 2:
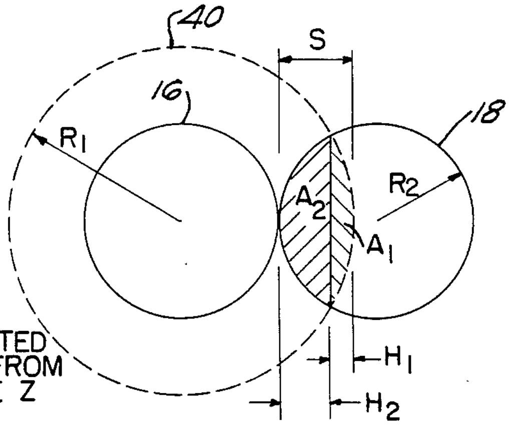
FIG. 2 shows unclad, juxtaposed transmit and a receive optical fibers of equal diameter.

FIG. 2 shows a distal end view of two adjacent unclad optical fibers having equal cross sections. Transmit fiber 16 and receive fiber 18 each have radii $R_2$ while the reflected illumination area 40 has a radius $R_1$. The illuminated area of receive fiber 18, $A_1+A_2$, may be defined as follows:

$$H_1 = \frac{S(2R_2 - S)}{2(R_1 + R_2 - S)}$$

$$H_2 = \frac{S(2R_1 - S)}{2(R_1 + R_2 - S)}$$

$$A_1 = R_1^2 \cos^{-1}\frac{R_1 - H_1}{R_1} - (R_1 - H_1)[2R_1H_1 - H_1^2]^{\frac{1}{2}}$$

$$A_2 = R_2^2 \cos^{-1}\frac{R_2 - H_2}{R_2} - (R_2 - H_2)[2R_2H_2 - H_2^2]^{\frac{1}{2}}$$

where S is the radial dimension of the illuminated area of fiber 18 and equals $H_1+H_2$.

Figure 3:
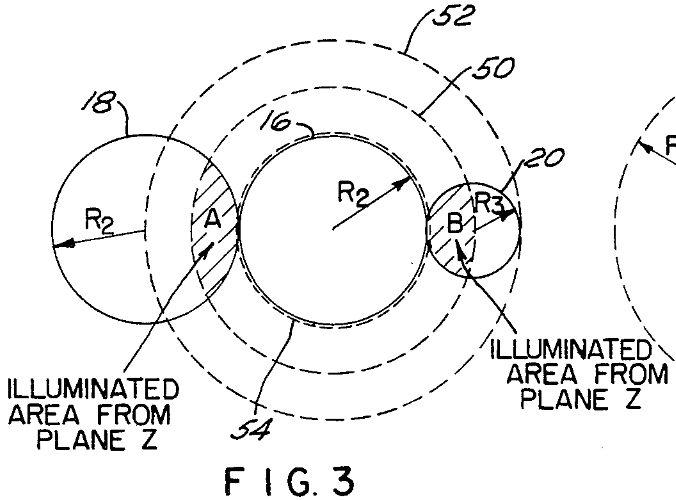
FIG. 3 shows the fiber pair of FIG. 2 with the addition of a second unclad small diameter fiber.

FIG. 3 shows a typical distal end of the transducer of FIG. 1 comprising central unclad transmitting optical fiber 16 of radius $R_2$ with one pair of unclad adjacent receiving fibers 18 and 20 of radii $R_2$ and $R_3$, respectively. For the exemplary discussion which follows, a numerical aperture of 0.25 has been assumed for all fibers for illustration purposes while core diameters of 100 and 50 microns have been chosen for $R_2$ and $R_3$ respectively because of presently available optical fibers. It is emphasized however that neither the numerical apertures nor fiber core radii nor the spacing between transmit and receive fibers are restricted to those illustrated as long as the two receiving fibers are of different diameters commensurate with the present teachings.

Figure 4:
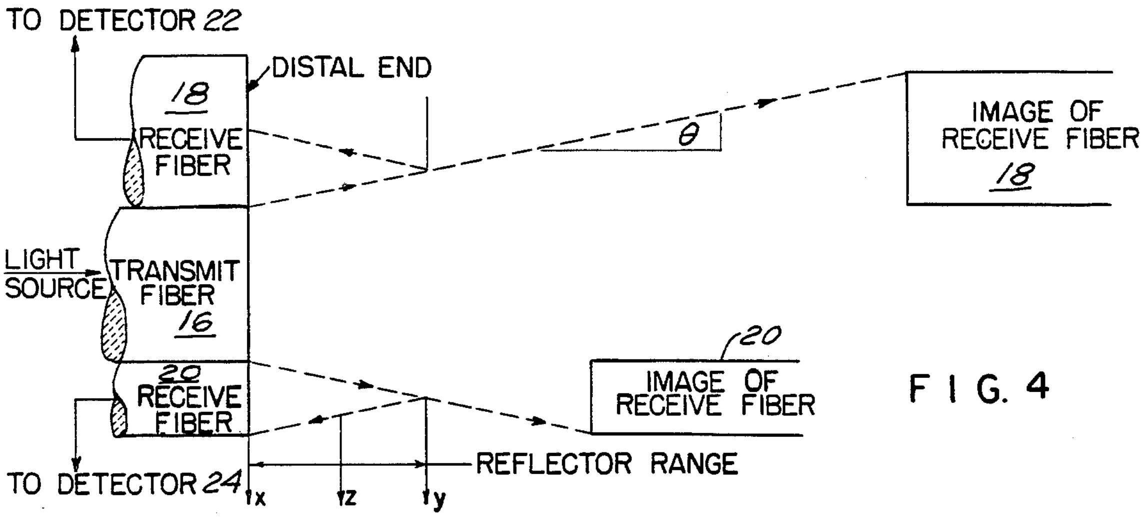
FIG. 4 shows the fiber arrangement of FIG. 3 in side view.

A side view of the FIG. 3 distal end is shown in FIG. 4; the range of the reflector positions X and Y representing the minimum and maximum cross-sections of the illuminating beam of interest to the discussion to follow. Illuminated areas 50, 52 and 54 of FIG. 3 correspond to reflector positions Z, Y and X of FIG. 4 respectively. It is noted that at position X neither of the receive fibers is illuminated while at position Y the entire cross-section of the 50 micron receive fiber 20 is illuminated and a portion of the 100 micron receive fiber 18 is also illuminated by area 50 as shown in the cross-sectional view of FIG. 3. The locations of the images of the receive fibers are also shown to aid the ray tracing approach.

Choosing an intermediate reflector position Z, where both receive fibers are partially illuminated as shown in FIG. 3, assume that transmit fiber 16 emits radiation from a coherent or incoherent optical source with a radiant flux $P_o$, in watts. Also assume that the cross-section 50 of the illuminating beam in plane Z is S, while the illuminated areas of the 100 micron and 50 micron receive fibers are A and B, respectively, and the radiant flux intercepted by the receiver fiber is $P_A$ and $P_B$, respectively. Since the irradiance is defined as the radiant flux per unit area one may write:

$$\frac{P_o}{S} = \frac{P_A}{A} = \frac{P_B}{B} \tag{1}$$

From equation (1) it follows that:

$$\frac{P_A}{P_o} = \frac{A}{S} \text{ and } \frac{P_B}{P_o} = \frac{B}{S} \tag{2}$$

A small axial displacement, $\Delta q$, of the reflector from the Z-plane leads to a small change in A/S and B/S such that system sensitivities for illuminated areas A and B are defined as, $$\Delta\left(\frac{A}{S}\right)/\Delta q \text{ and } \Delta\left(\frac{B}{S}\right)/\Delta q \tag{3}$$

Figure 5:
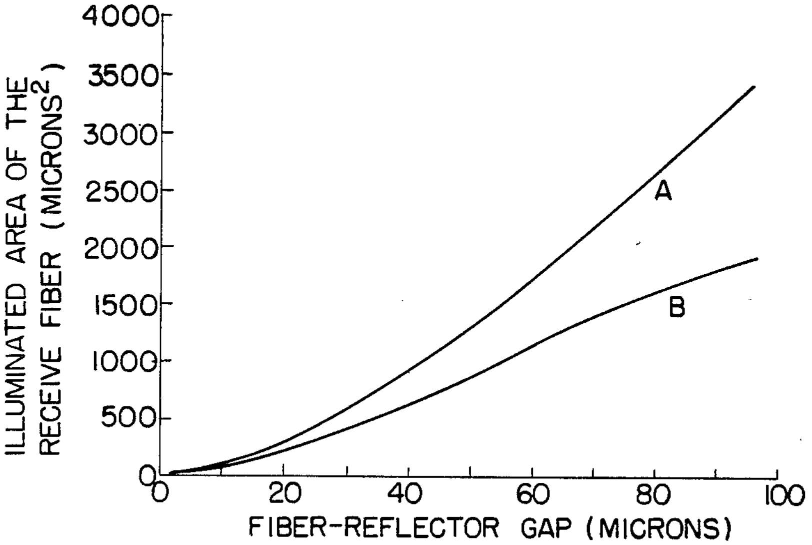
FIG. 5 shows a graph of the illuminated areas of the receive fibers of FIG. 3 as a function of fiber-reflector gap.
Figure 6:
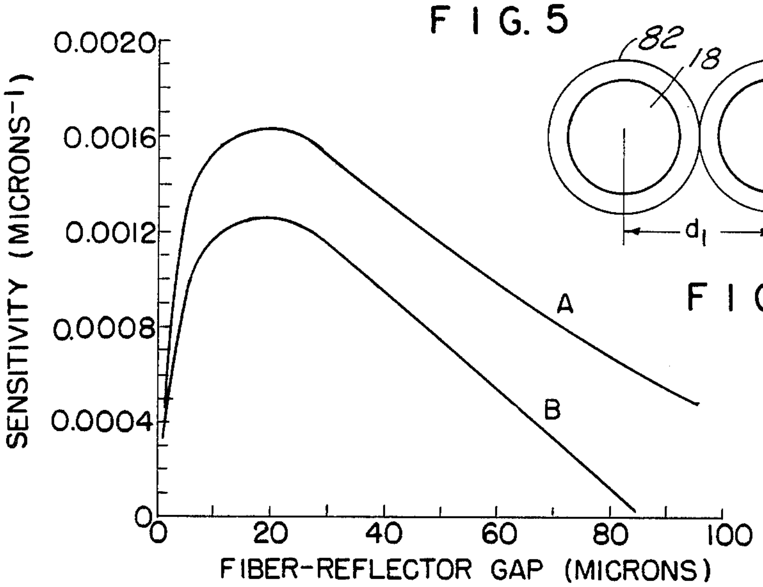
FIG. 6 shows a graph of the relative sensitivities of the receive fibers of FIG. 3.

FIG. 5 shows the illuminated areas A and B as a function of fiber-reflector gap for unclad 100 and 50 micron receive fibers while FIG. 6 shows their relative sensitivities according to equation (3). In both figures the fiber-reflector gap range between planes X and Y of FIG. 4 has been used.

It may now be shown that much improved sensitivities can be obtained while making the output signals independent of changes in the input power levels. This is accomplished as follows. Using Equation (2), $$\frac{A/S}{B/S} = \frac{A}{B} \tag{4}$$

while the sensitivity of the ratio of areas becomes $$\Delta\left(\frac{A}{B}\right)/\Delta q \tag{5}$$

Figure 7:
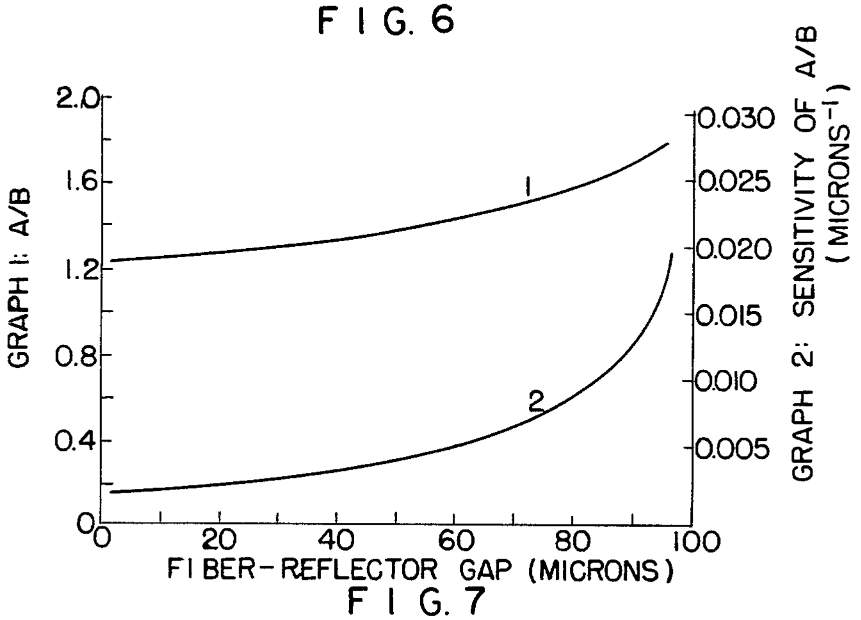
FIG. 7 shows graphs of the A/B output of one divider of FIG. 1 and the A/B sensitivity for this output for the fiber arrangement of FIG. 3.

FIG. 7 shows the results of Equations (4) and (5) for the unclad fibers of FIG. 3 as graphs 1 and 2 over the X-Y fiber-reflector gap range of FIG. 4.

Conversely, the difference divided by the sum of illuminated areas A and B can be obtained thusly $$\frac{A/S - B/S}{A/S + B/S} = \frac{A - B}{A + B}, \tag{6}$$

yielding a sensitivity defined by $$\Delta\left(\frac{A-B}{A+B}\right)/\Delta q \quad (7)$$

Figure 8:
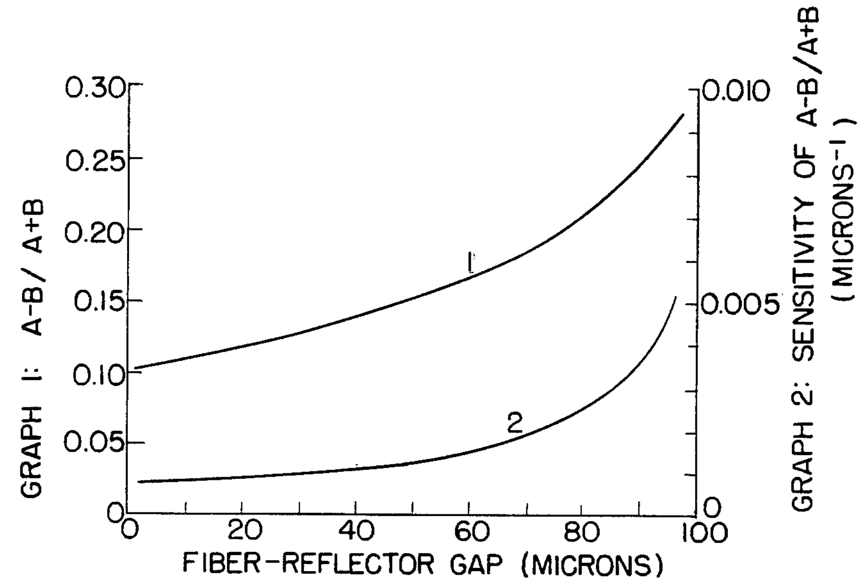
FIG. 8 shows graphs of the A−B/A+B output of the divider of FIG. 1 and the A−B/A+B sensitivity for this output for the fiber arrangement of FIG. 3.

FIG. 8 shows the results of Equations (6) and (7) for the unclad fibers of FIG. 3 as graphs 1 and 2 respectively over the X-Y fiber-reflector gap of FIG. 4.

This theoretical approach lends itself to the determination of the optimum selection of, transmit/receive fiber core dimensions, the distance between fiber core centers and the numerical apertures associated with each fiber. In addition, the index of refraction $\mu$ of gap medium 17*b* of FIG. 1 can be included in the calculations. By definition the numerical aperture (NA) is the sine of the angle (sin $\theta$) representing the light cone leaving the core of an optical fiber as shown in FIG. 4. This definition assumes an air medium ($\mu=1$) in contact with the core. However, according to the teachings of the Law of Refraction attributed to Snell, for any medium other than air or a vacuum, the angle $\theta$ can be found by dividing the numerical aperture of the optical fiber by the index of refraction $\mu$ of the medium.

Computer-generated data were produced and graphed based on the theoretical predictions previously described. FIGS. 5 and 6 show the illuminated areas, A and B, and the corresponding sensitivity of receive fibers 18 and 20 of FIG. 3 as a function of the fiber-reflector gap. It is noted that the 100/100 micron fiber pair yields a better sensitivity than the 100/50 micron pair. FIGS. 7 and 8 provide results for the sensitivities predicted by the ratio of A/B and the differences A−B over the sum A+B ratio respectively for the three-fiber arrangement of FIGS. 3 and 4. Here, while the gap range is similar to that of FIG. 6, best results occur for operation near 90 microns as compared to about 5 microns for the two-fiber pair. In addition, the sensitivities show a sizable improvement, particularly for the A/B ratio.

Figure 9:
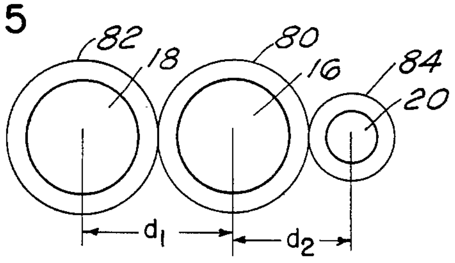
FIG. 9 shows a juxtaposed three fiber arrangement as in FIG. 3 with the fiber cladding left in place.
Figure 11:
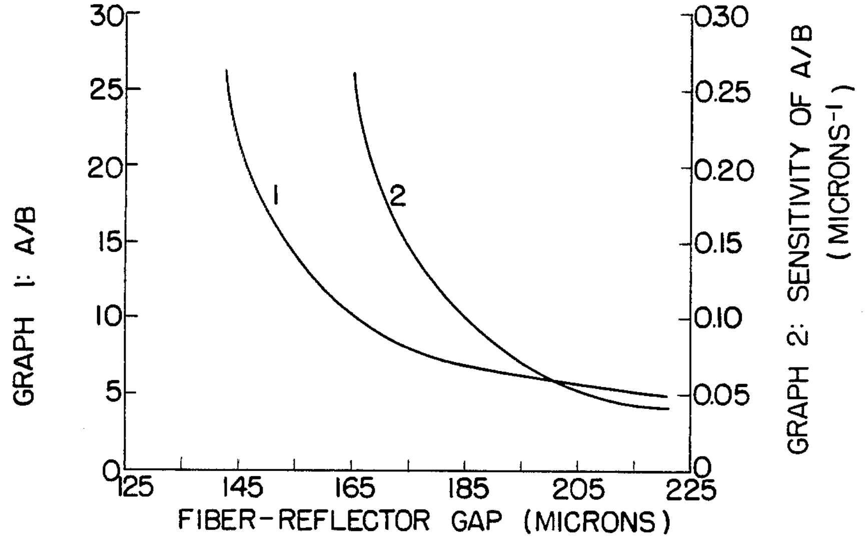
FIG. 11 shows selected segments of the graphs of FIG. 10 with expanded vertical scales.
Figure 10:
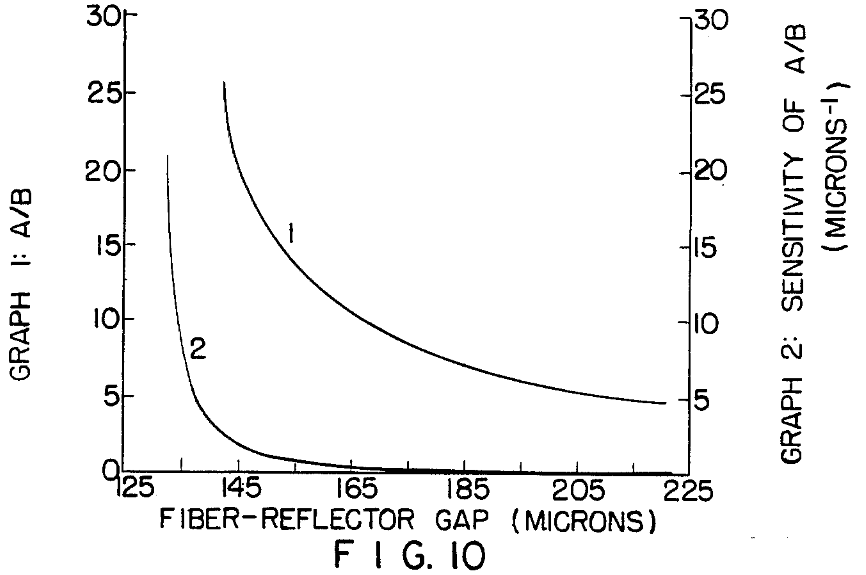
FIG. 10 shows graphs of the A/B output and the sensitivity of the clad fibers of FIG. 9.

FIG. 9 shows a juxtaposed three-fiber arrangement as in FIG. 3 but with fibers 16, 18 and 20 having claddings 80, 82 and 84 respectively which have a direct effect on inter-fiber spacings $d_1$ and $d_2$. In order to establish criteria related to fiber core spacing and numerical aperture, two commercially available optical waveguides "Corguide" by Corning Co., were chosen for evaluation. The transmit fiber and one receive fiber had 105/140 micron core/cladding dimensions with a 0.3 NA while the second receive fiber had a 52/125 micron core/cladding dimension and a 0.21 NA. The cladding remained as part of each fiber. FIGS. 10 and 11 present the results of the A/B ratio for this clad fiber case. FIG. 11 reproduces a portion of the graph of FIG. 10 with an expanded sensitivity scale. Several improvements are apparent over the previous data for FIGS. 7 and 8. A significant increase in sensitivity is evident while the fiber-reflector gap is extended further. Table 1 below summarizes the results presented herein.

TABLE 1

| Transmit/Receive Fibers | Output Ratio | Sensitivity (microns$^{-1}$) | Fiber/Reflector Gap (microns) |
|---|---|---|---|
| 100,100 Core 0.25,0.25 NA 2-Fiber | | $1.10 \times 10^{-3}$ | 3.87 |
| 100,100,50 Core 0.25,0.25,0.25 NA 3-Fiber | A/B | $1.59 \times 10^{-2}$ | 93.0 |
| | $\frac{A-B}{A+B}$ | $4.37 \times 10^{-3}$ | 93.0 |

TABLE 1-continued

| Transmit/Receive Fibers | Output Ratio | Sensitivity (microns$^{-1}$) | Fiber/Reflector Gap (microns) |
|---|---|---|---|
| 105/140,105/140,52/125 Core/Cladding | A/B | 7.99 | 135.4 |
| 0.30,0.30,0.21 NA 3-Fiber | A/B | 1.40 | 145.1 |

It is noted that the 7.99/microns$^{-1}$ sensitivity shown in Table 1 was obtained for a fiber/reflector gap of 135.4 microns using curve 2 of FIG. 10. This is the highest attainable sensitivity due to the steepest slope occuring at that gap. It is also noted that the sensitivity of 1.40 was obtained for a fiber/reflector gap of 145.1 microns using the same curve 2 of FIG. 10 but corresponding to a point where the slope changes less rapidly. It, is however, relevant that the sensitivity remains much better than previously attainable with the two fiber lever of FIG. 2.

The advantages and new features with this multi-lever fiber optic transducer include: a reduction in the number of optical fibers in the transmit and receive bundles to three, one to transmit and two to receive; improved sensitivity over prior art based on the same number of transmit/receive fibers used; the output is independent of input power variations, a feature that is very important because it assures that any small deviations in the fiber-reflector gap occurring after calibration will not adversely affect the output; improved operation at larger fiber-reflector gaps; a feature that is attained without the use of additional image extenders and provides better dynamic range with reduced design requirements; simplicity; low cost; high reliability; and the possibility of improved signal to noise ratio and reduced depth dependence exists.

It is noted that this approach can easily be substituted for the transducer elements in the fiber optic lever towed array described in U.S. patent application Ser. No. 547,273.

What has thus been described is an improved bifurcated fiber optic transducer comprising one transmit fiber and two receive fibers, each receive fiber having a different core diameter. The three fibers are separated at one end and combined at the distal end in the vicinity of a miniature reflective surface sensitive to axial motion caused by minute pressure changes, either in air or water, such that any displacement of the reflector from equilibrium will increase or decrease the illuminated areas of the two receive fibers. This permits generation of a processed output signal proportional to this motion thus providing a sensitivity and an output independent of variations at the input.

Obviously many modifications and variations of the present invention may become apparent in light of above teachings. For example, two approaches have been described to implement this concept, namely, the area ratio A/B sensitivity and the difference over sum area ratio A−B/A+B sensitivity. Other arrangements of the collinear three fiber bundle shown in FIG. 3 may also provide improved sensitivity and an output independent of input variations as might multiple large/small pairs clustered around the periphery of a transmit fiber.

In light of the above, it is therefore understood that within the scope of the appended claims, the invention may be practiced otherwise than as specifically described.

What is claimed is:

1. A multi-lever hydrophone system, for receiving acoustic signals from a remote sound source, comprising:

a light source, for providing a light beam;

a transmit optical fiber having a first preselected cross sectional area and numerical aperture, the proximal end of said fiber being attached to said light source, for transmitting said light beam therethrough to the distal end thereof, said light beam then exiting therefrom;

miniature reflector means, positioned a preselected distance from and aligned parallel to the end plane of said transmit fiber distal end so as to form a fiber-reflector gap therebetween, for providing an axially responsive reflective surface upon which the light beam exiting said transmit fiber distal end may impinge, said reflector means moveably responding to said acoustic signals in proportion thereto;

a bead of optically clear potting material, filling the gap between said reflector means and said transmit fiber end plane, for moveably bonding said reflector means to said transmit fiber such that the light beam exiting from said transmit fiber propagates in a conically expanding manner therethrough to said reflector means, reflects therefrom, and further expands conically while propagating back through said potting material to said transmit fiber end plane, the reflected circular illuminated area being greater than that of the transmit fiber;

at least one receive optical fiber pair further comprising a first receiving fiber having a second preselected cross sectional area and numerical aperture and a second receive fiber having a third cross sectional area and numerical aperture, said receive fiber pair being juxtaposed alongside said transmit fiber distal end such that the transmit fiber and the receive fiber pair distal ends are aligned to form a common end plane, said at least one receive fiber pair distal ends also being moveably bonded to said bead of optically clear potting material, for receiving said reflected circular illuminated area of said light beam from said reflector means, the areal portion of said circular illuminated area which impinges on said first receive fiber being designated area 'A' and the areal portion of said circular illuminated area which impinges on said second receive fiber being designated area 'B', and transmitting light energy proportional to said illuminated areas A and B;

a first photodetector means, attached to the proximal end of said first receive fiber, for receiving the light energy transmitted therethrough and converting said transmitted light energy to a proportional electrical signal A;

a second photodetector means, attached to the proximal end of said second receive fiber, for receiving the light energy transmitted therethrough and converting said transmitted light energy to a proportional electrical signal B; and signal processing means, attached to said first and second photodetector means, for receiving said A and B electrical signals therefrom and outputing a combined electrical signal modulated in proportion to said acoustic signals from said sound source, said signal processing means further comprising a first output generating means, attached to said first and second photodetector means, for receiving said A and B electrical signals and producing a signal representing the ratio A/B therefrom, and a second output generating means, attached to said first and second photodetector means, for receiving said A and B electrical signals and producing a signal representing the ratio A−B/A+B therefrom.

2. A system according to claim 1 wherein said A−B/A+B ratio generating means further comprising:

an adder, for producing an A+B signal;

a subtractor, for producing an A−B signal; and a divider, for receiving said A−B output from said subtractor and said A+B output from said adder, and producing the quotient A−B/A+B therefrom.

3. A system according to claim 2 wherein said transmit fiber and said first receive fiber have equal cross sectional areas and the same numerical apertures, and said second receive fiber as a smaller cross sectional area than said first receive fiber.

4. A system according to claim 3 wherein said transmit fiber and said first and second receive fibers have cladding about the cores thereof.

5. A system according to claim 3 wherein said transmit fiber and said first and second receive fibers are unclad cores.

* * * * *